Figure 1:
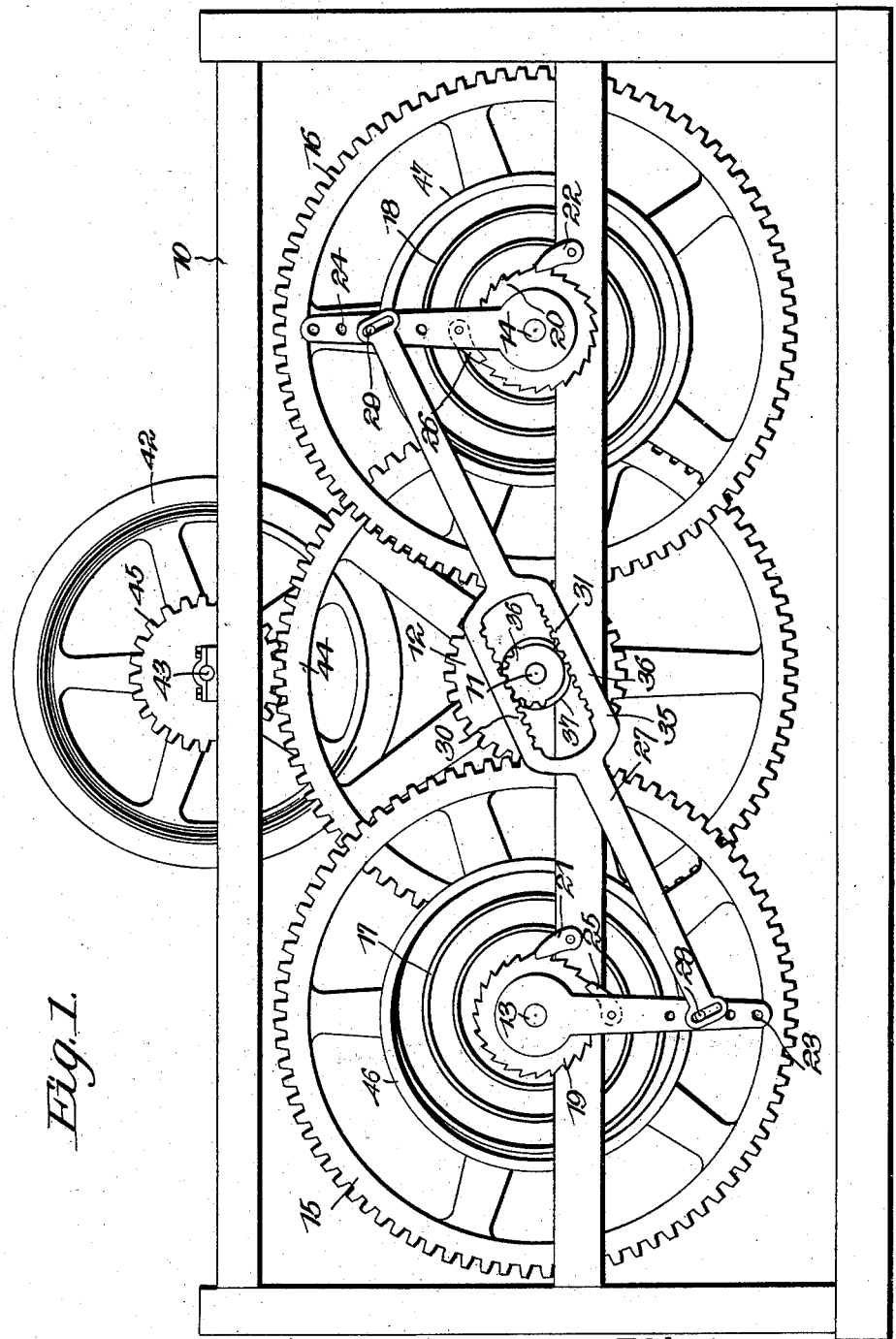

No. 750,327. PATENTED JAN. 26, 1904.
W. WEINER.
SPRING MOTOR.
APPLICATION FILED MAY 1, 1903.
NO MODEL. 2 SHEETS—SHEET 1.

Witnesses
E. J. Stewart
E. N. Woodward.

W. Weiner, Inventor,
by C. A. Snow & Co.
Attorneys

No. 750,327. PATENTED JAN. 26, 1904.
W. WEINER.
SPRING MOTOR.
APPLICATION FILED MAY 1, 1903.
NO MODEL. 2 SHEETS—SHEET 2.
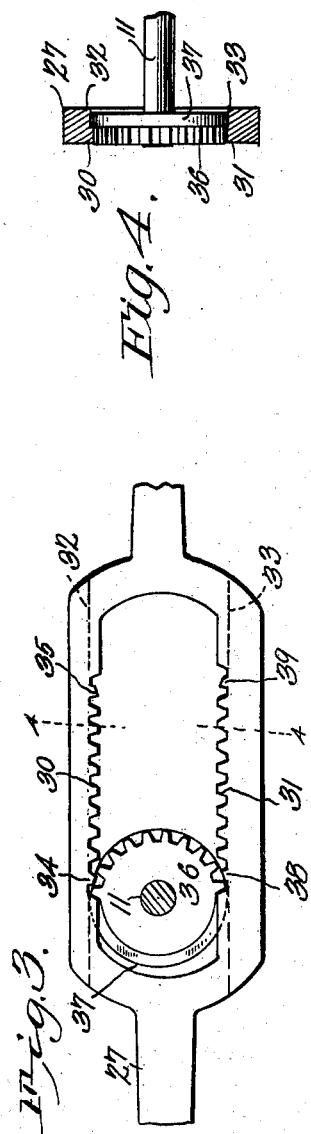
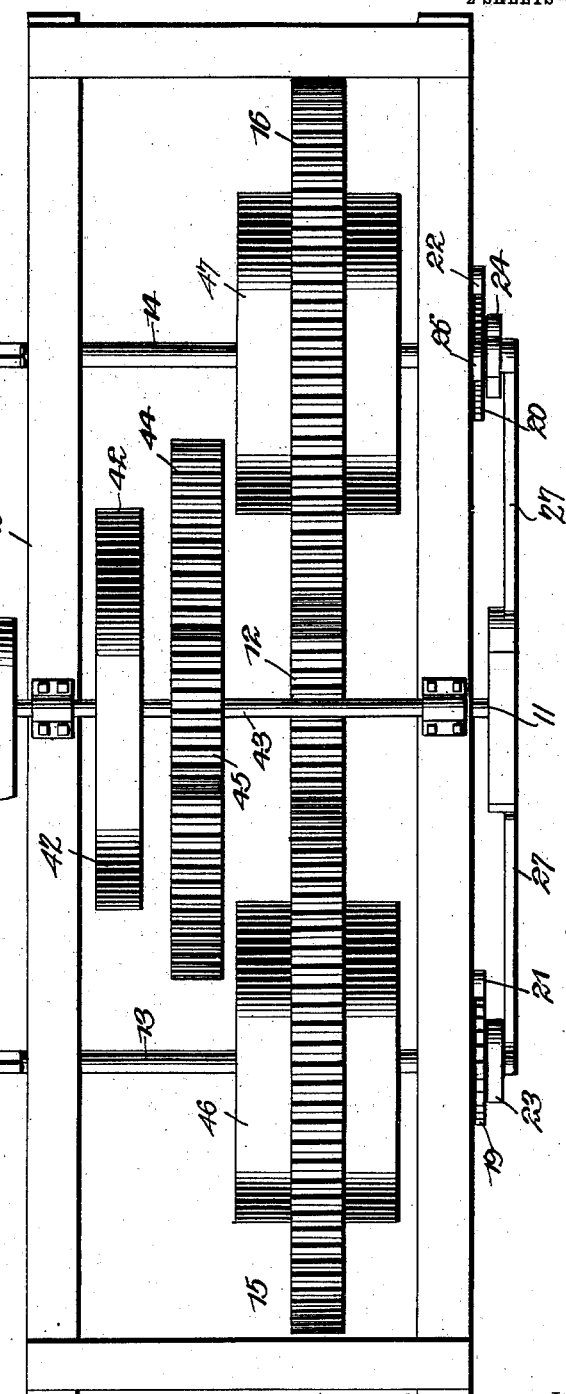
Witnesses
E. H. Stewart
C. N. Woodward
W. Weiner, Inventor;
by C. A. Snow & Co.
Attorneys No. 750,327. Patented January 26, 1904.

UNITED STATES PATENT OFFICE.

WILHELM WEINER, OF WYMORE, NEBRASKA, ASSIGNOR OF ONE-HALF TO HENRY SCHMITZ, OF WYMORE, NEBRASKA.

SPRING-MOTOR.

SPECIFICATION forming part of Letters Patent No. 750,327, dated January 26, 1904.

Application filed May 1, 1903. Serial No. 155,202. (No model.)

*To all whom it may concern:*

Be it known that I, WILHELM WEINER, a citizen of the United States, residing at Wymore, in the county of Gage and State of Nebraska, have invented a new and useful Spring-Motor, of which the following is a specification.

This invention relates to improvements in motors operated by spring-power, and has for its object to simplify and improve devices of this character and produce a device wherein a portion of the power exerted by the springs is utilized to alternately rewind the springs, and thus prolong the running time; and the invention consists in certain novel features, as hereinafter shown and described, and specified in the claims.

In the drawings illustrative of the invention, in which corresponding parts are denoted by like designating characters, Figure 1 is a side elevation, and Fig. 2 is a plan view, of the device complete. Fig. 3 is an enlarged detail of the arm-actuating mechanism. Fig. 4 is a cross-section on the line 4 4 of Fig. 3.

The improved device consists of a supporting-frame 10 of any approved shape or of any suitable material and having a main driven shaft 11, mounted for rotation intermediately thereof by suitable bearings, as shown, and carrying a pinion 12. Spaced from the shaft 11 upon either side are shafts 13 14, likewise mounted for rotation upon the frame 10, and having gears 15 16 intermeshing with the pinion 12. Connected by their inner ends to the shafts 13 14 are coiled springs 17 18, while the outer ends are connected to drums 46 47, which are in turn connected to the gears 15 16, running loose upon the shafts 13 14. Rigidly connected to the shafts 13 14 are ratchet-wheels 19 20, held from turning backward by check-pawls 21 22, and rotating loosely upon the shafts outside the ratchets are lever-arms 23 24, provided, respectively, with pawls 25 26, operatively engaging the ratchet-wheels. The lever-arms 23 24 are reversely disposed relative to the shafts 13 14, with their free ends connected by arm 27, as shown. By this arrangement the reacting force of one spring or set of springs transmits power to the driven shaft, and thereby actuates rack-lever 27 and the corresponding oscillating ratchet-lever 23 or 24, as the case may be, and winds the other spring or springs to a certain extent.

The levers 23 24 will each preferably be provided with a plurality of spaced apertures, in which the connecting-pins 28 29 may be placed to provide for the adjustment of the arm relative to the levers, and thus regulate the stroke, as hereinafter explained.

Centrally of the arm 27 is arranged a longitudinal aperture, the sides of the aperture being spaced and provided with oppositely-disposed gear-racks 30 31, and disposed parallel of the gear-racks are tracks 32 33, the tracks extending beyond the teeth of the racks at each end, as indicated by dotted lines in Fig. 3.

Mounted rigidly upon the shaft 11 is a half-pinion 36, having one-half the full number of teeth and with the remainder blank, as shown. Attached to or formed integral with the pinion 36 is a circular disk 37, operating between the tracks 30 31, as shown in Figs. 3 and 4. The end teeth 34 35 of the rack 30 and the teeth 38 39 of the opposite rack 31 are shorter than the remaining teeth, as shown. By this arrangement as the lever 27 reciprocates the end tooth of the pinion 36 at one side will freely roll from the shorter tooth of the lower rack 31 and the other end tooth of the pinion as freely roll into engagement with the opposite rack 30, and thus obviate any tendency of the teeth of the pinion to "climb" the teeth of the rack. The circular guide-disk 37 thus causes a uniform motion without jarring or concussion, while the shortened end teeth of the racks effectually prevent any tendency of the teeth to become locked or "ride" one upon the other. By this arrangement as the shaft 11 revolves the teeth of the pinion 36 engage the rack 30 or 31, as the case may be, and moves the arm 27 in one direction, and at the end of the stroke the mutilated gear is rolled over against the opposite rack and the arm 27 moved in the opposite direction, and so on, as will be obvious, the action causing the mutilated pinion to be alternately engaged with the racks 30 31 and correspondingly moving the arm 27 back and forth, and by reason of its connection with the levers 23 24 this movement will intermittently and alternately wind up the springs to an extent equal to the throw of the arm. By this simple arrangement the power of the springs is utilized to continuously rotate the shaft 11 and a portion of its force utilized to rewind the springs, and thus prolong the period of their activity.

The shaft 11 may be connected to operate any apparatus or machine which it is adapted to run within the power of the springs and will preferably be supplied with a "balance-wheel" 42 upon a counter-shaft 43, adapted to be actuated through gearing 44 45 from the shaft 11 to increase the momentum and "steady" the movements; but while the mechanism shown is an approved one I do not wish to be limited thereto, as minor changes may be made therein without departing from the principle of this invention or sacrificing any of its advantages. It is obvious, therefore, that the parts may be increased or decreased in size to correspondingly increase or decrease the power of the motor, and the right is reserved to the use of the device for any purpose for which it is adapted.

Having thus described the invention, what I claim is—

1. A spring-motor consisting of a main frame, a driven shaft mounted for rotation upon said frame, shafts mounted for rotation upon said frame and having operating-springs connected therewith, means connected with said shafts for operating said driven shaft, an arm connected to said spring-shafts, and adapted to be vibrated longitudinally, and means carried by said driven shaft for alternately operating said arms to rewind said springs intermittently and alternately, substantially as described.

2. A spring-motor consisting of a main frame, a driven shaft mounted for rotation upon said frame, shafts mounted for rotation upon said frame and having operating-springs connected therewith, means connected with said shafts to operate said driven shaft, ratchet-wheels carried by said spring-shafts, ratchet-levers having pawls engaging said ratchet-wheels and mounted for oscillation upon said spring-shafts, an arm connected by its ends to said ratchet-levers, and means carried by said driven shaft to alternately operate said arm to intermittently and alternately rewind said springs, substantially as described.

3. A spring-motor consisting of a main frame, a driven shaft mounted for rotation upon said frame, shafts mounted for rotation upon said frame and having operating-springs connected therewith, and means connected with said shafts to operate said driven shaft, an arm operatively connected by its ends to said spring-shafts, and provided with an intermediate aperture having oppositely-disposed longitudinal gear-racks, a mutilated pinion carried by said driven shaft and adapted to alternately engage said gear-racks, and to correspondingly vibrate said arm to cause said springs to be intermittently and alternately rewound, substantially as described.

4. A spring-motor consisting of a main frame, a driven shaft mounted for rotation upon said frame and carrying a pinion, spring-shafts mounted for rotation upon said frame at opposite sides of said driven shaft and having gears engaging the pinion thereon, springs connected to independently rotate said spring-shafts, ratchet-wheels upon said spring-shafts, reversely-disposed ratchet-levers mounted for rotation upon spring-shafts and having pawls engaging said ratchet-wheels, an arm connected by its ends to the free ends of said ratchet-levers, and means carried by said driven shaft for alternately vibrating said arm to alternately actuate said ratchet mechanisms and intermittently and alternately rewind said springs, substantially as described.

5. A spring-motor consisting of a main frame, a driven shaft mounted for rotation upon said frame and carrying a pinion, spring-shafts mounted for rotation upon said frame at opposite sides of said driven shaft and having gears engaging the pinion thereon, springs connected to independently rotate said spring-shafts, reversely-disposed ratchet-wheels upon said spring-shafts, ratchet-levers mounted for rotation upon the spring-shafts and having pawls engaging said ratchet-wheels, an arm connected by its ends to the free ends of said ratchet-levers and having oppositely-disposed intermediate gear-racks, and a mutilated pinion carried by said driven shaft and adapted to alternately engage said racks, substantially as described.

6. A spring-motor consisting of a main frame, a driven shaft mounted for rotation upon said frame, spring-shafts mounted for rotation upon said frame and having means connectd therewith to operate said driven shaft, springs connected to operate said spring-shafts, an arm operatively connected by its ends to said spring-shafts and provided with a longitudinal aperture having oppositely-disposed gear-racks therein and provided with guide-tracks parallel to said racks, a mutilated pinion carried by said driven shaft and operating between said racks, and a guide-disk carried by said driven shaft and operating between said tracks, and means whereby said pinion is caused to be alternately engaged with said racks and vibrate said arm, substantially as described.

7. A spring-motor consisting of a main frame, a driven shaft mounted for rotation upon said frame, spring-shafts mounted for rotation upon said frame and having means connected therewith to operate said driven shaft, springs connected to operate said spring-shafts, an arm operatively connected by its ends to said spring-shafts, and provided with an intermediate aperture having oppositely-disposed longitudinal gear-racks, with the end teeth of each rack reduced in height, a mutilated pinion carried by said driven shaft and adapted to alternately engage said gear-racks, and correspondingly vibrate said arm, to intermittently and alternately rewind said springs, substantially as described.

In testimony that I claim the foregoing as my own I have hereto affixed my signature in the presence of two witnesses.

WILHELM WEINER.

Witnesses:
CHARLES W. COREY,
ALPHONSO K. SMITH.